Patented Nov. 6, 1928.

1,690,775

UNITED STATES PATENT OFFICE.

WILHELM ECKERT, OF HOCHST-ON-THE-MAIN, GERMANY, ASSIGNOR TO GRASSELLI DYESTUFF CORPORATION, OF NEW YORK, N. Y., A CORPORATION OF DELAWARE.

VAT DYESTUFFS DERIVED FROM 1,4,5,8-NAPHTHALENE TETRACARBOXYLIC ACID AND AROMATIC ORTHO-NITRO-AMINES AND PROCESS OF PREPARING THE SAME.

No Drawing. Application filed January 27, 1927, Serial No. 164,126, and in Germany January 29, 1926.

My present invention relates to the preparation of new vat dyestuffs.

I have found that new valuable dyestuffs are obtained by condensing the dianhydride of 1.4.5.8-naphthalenetetracarboxylic acid or this acid itself, or substitution products thereof, with an ortho-nitro-amino compound and then reducing the condensation products thus obtained, whereby a closure of the ring takes place and the corresponding imidazol derivatives are formed, for instance in the following manner:

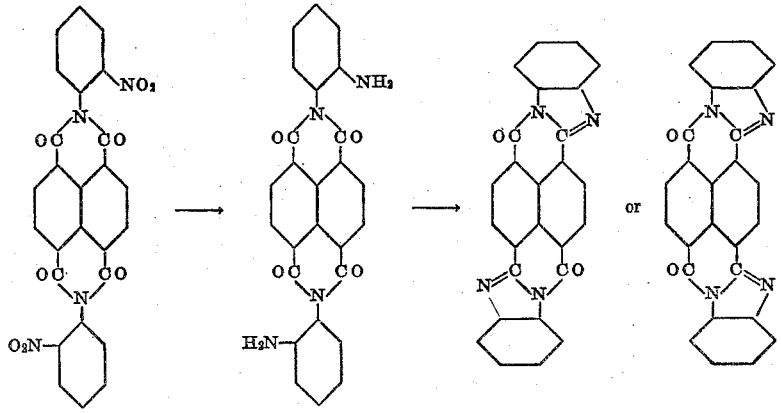

The reduction may be carried out by means of an alkaline agent, such as sodium sulfide, hydrosulfite or the like, or by means of an acid agent such as iron in a solution of glacial acetic acid.

The following examples serve to illustrate the invention but they are not intended to limit it thereto, the parts are by weight:

(1) 15 parts of the dianhydride of 1.4.5.8-naphthalenetetracarboxylic acid and 30 parts of 3-nitro-4-amino-1-phenetol are heated to boiling for 6–7 hours in 150 parts of nitrobenzene. On cooling, the 1.4.5.8-naphthalenetetracarboxylic acid-di-(o-nitro-p-phenetidid) separates which is filtered by suction, washed with alcohol and dried.

10 parts of the condensation product thus obtained are dissolved, while hot, in 200 cc. of glacial acetic acid and then heated to gentle boiling for about one hour with 12 gr. of iron powder, preferably with addition of a few cc. of concentrated hydrochloric acid. On cooling, the dyestuff separates which is then filtered by suction, freed from the non-consumed iron powder and dried. It forms a brown powder and gives a vat of an olive-green color with an intense red fluorescence which dyes cotton, on exposure to the air, reddish-brown tints.

The dyestuff has probably the formula:

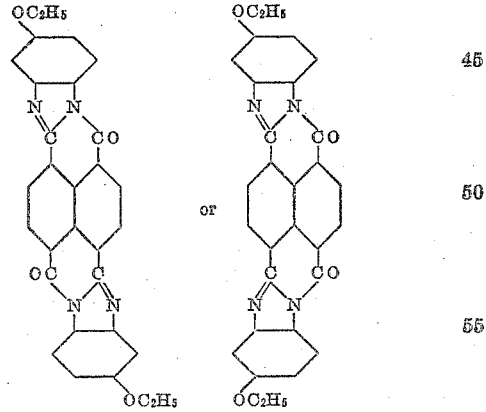

If for the condensation is used 3-nitro-4-amino-1-anisol instead of 3-nitro-4-amino-1-phenetol and, otherwise, the procedure indicated above is followed, there is obtained a dyestuff which dissolves in nitrobenzene to a reddish-brown solution and in concentrated sulfuric acid to a red solution. This dyestuff gives a green vat with a red fluorescence, which dyes cotton on exposure to the air a bright brown tint.

(2) 10 parts of the dianhydride of 1.4.5.8-naphthalenetetracarboxylic acid are heated to boiling for 5–6 hours in 100 parts of nitrobenzene with 20 parts of ortho-nitraniline. On cooling, the condensation product crystallizes out as brown needles which melt at a temperature exceeding 280° C. and dissolve in concentrated sulfuric acid to a yellow solution.

8 parts of the 1.4.5.8-naphthalenetetracarboxylic acid-di-(o-nitranilid) so obtained are heated to boiling with a solution of 50 parts of crystallized sodium sulfide in 50 parts of water, until all unattacked parent material has disappeared. The mass is then diluted with water and air blown into it for some time whereupon it is filtered by suction and washed. The resulting dyestuff forms, when dry, a bright red powder which dissolves in concentrated sulfuric acid to a yellowish-brown solution. It gives a green vat with an intense red fluorescence which dyes cotton on exposure to the air, a brilliant red tint.

As the 1.4.5.8-naphthalenetetracarboxylic acid reacts in substantially the same manner as the anhydride, I understand in the following claims by the term "1.4.5.8-naphthalenetetracarboxylic acid compound" not only this acid itself but also its anhydride and by "an ortho-nitro-amino compound" I understand also the salts of such ortho-nitro-amines.

I claim:

1. The process of preparing vat dyestuffs, consisting in condensing a 1.4.5.8-naphthalenetetracarboxylic acid compound with an ortho-nitro-amino compound and then reducing the condensation product.

2. The process of preparing vat dyestuffs, consisting in condensing a 1.4.5.8-naphthalenetetracarboxylic acid compound with an ortho-nitro-amine of the benzene series and then reducing the condensation product.

3. The process of preparing vat dyestuffs, consisting in condensing a 1.4.5.8-naphthalenetetracarboxylic acid compound with 3-nitro-4-amino-1-phenetol and then reducing the condensation product.

4. As a new product, the dyestuff of the formula:

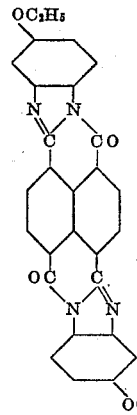 or 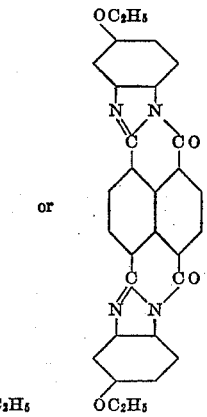

which forms a brown powder and gives a vat of an olive-green color with an intense red fluorescence dyeing cotton on exposure to the air reddish-brown tints.

In testimony whereof, I affix my signature.

Dr. WILHELM ECKERT.